United States Patent
MacNeil

Patent Number: 6,082,634
Date of Patent: Jul. 4, 2000

[54] WASH SPRAY APPARATUS FOR VEHICLES

[76] Inventor: Daniel J. MacNeil, P.O. Box 1057, Barrie, Ontario, Canada, L4M 5E1

[21] Appl. No.: 09/317,479

[22] Filed: May 24, 1999

[51] Int. Cl.[7] .............................. B05B 3/04; F16V 15/50; B08B 3/00

[52] U.S. Cl. ............................... 239/263; 74/18.1; 74/60; 134/123

[58] Field of Search ................................ 239/225.1, 227, 239/263, 263.3, 264, 556, 566; 134/123, 172; 74/18.1, 60

[56] References Cited

U.S. PATENT DOCUMENTS

| | | |
|---|---|---|
| 1,586,997 | 6/1926 | Hull . |
| 2,761,170 | 9/1956 | Bonneau . |
| 3,259,138 | 7/1966 | Heinicke . |
| 3,346,895 | 10/1967 | Consolo . |
| 3,391,701 | 7/1968 | Richardson et al. . |
| 3,481,346 | 12/1969 | McBurnett . |
| 3,529,611 | 9/1970 | Daum et al. . |
| 3,557,808 | 1/1971 | Gusse . |
| 3,650,281 | 3/1972 | Hurst . |
| 3,667,486 | 6/1972 | Cole et al. . |
| 3,729,763 | 5/1973 | Coley . |
| 3,822,431 | 7/1974 | Van Brakel . |
| 4,178,948 | 12/1979 | Swinehart . |
| 4,220,170 | 9/1980 | Hebert et al. . |
| 4,244,523 | 1/1981 | Looper . |
| 4,651,925 | 3/1987 | Harris . |
| 4,719,932 | 1/1988 | Burton . |
| 4,895,307 | 1/1990 | Swinehart et al. ...................... 239/263 |
| 4,971,084 | 11/1990 | Smith et al. . |
| 4,985,957 | 1/1991 | Belanger et al. . |
| 5,188,293 | 2/1993 | Burton . |
| 5,778,908 | 7/1998 | Shelstad . |
| 5,853,127 | 12/1998 | Heembrock .............................. 239/227 |

OTHER PUBLICATIONS

PDQ Manufacturing, Inc. Advertisement of "Gatling Gunner" —Oct. 1990.

PDQ Manufacturing, Inc. Advertisement for "Clear Through" —Mar. 1995.

*Primary Examiner*—Kevin Weldon
*Assistant Examiner*—Sean P. O'Hanlon
*Attorney, Agent, or Firm*—Barnes & Thornburg

[57] ABSTRACT

A wash spray apparatus that is particularly suitable for use in automatic car washes comprises an array of nozzles on a nozzle head. Water is supplied to the nozzle head through one or more flexible hoses, and the nozzle head is driven so that the spray from the nozzles moves through a conical path. The drive is effected by an hydraulic motor connected to the nozzle head through a nutating mechanism which produces the desired movement of the spray without rotation of the nozzle head.

8 Claims, 4 Drawing Sheets

WASH SPRAY APPARATUS FOR VEHICLES

BACKGROUND OF INVENTION a) Field of Invention

This invention relates to a new or improved wash spray apparatus which is designed to produce a close spray pattern which swings through a conical range of movement to impinge upon an object such as an automobile, that is to be cleaned, describing a rapidly repeating pattern of overlapping circles thereon. Movement of the object to be cleaned longitudinally of the spray apparatus will produce a continuously sweeping circular spray suitable for use e.g. in cleaning the wheels, lower doors and rocker panels of an automobile in a car wash.

Description of the Prior Art

Over the years many of forms of spraying apparatus have been used in automatic car washes to provide desired cleaning patterns and spraying effects upon the automobiles, trucks, and the like that are to be cleaned.

For example U.S. Pat. No. 4,716,916 Hodge shows a car wash arrangement in which spraying nozzles are provided in manifolds arranged along the sides of the path of movement of the automobile through the car wash, the manifolds being oscillated at a suitable rate, e.g. 400 or 500 cycles per minute, so that every fractional surface of the vehicle is impinged by zero degree streams of pressurized water jets to provide an effective cleaning action.

U.S. Pat. No. 5,188,293 Burton discloses a vehicle washing apparatus in which a number of nozzles are mounted on elbows which are supplied from an angled rotating central pipe. As the central pipe rotates the clustered spray pattern from the nozzles rotates in a circular manner to wash the vehicle. Water is supplied to the rotating central pipe through a rotary joint, and this can create a sealing problem.

SUMMARY OF THE INVENTION

The present invention is concerned with a wash spray apparatus which can provide a high intensity rotating wash spray, without however requiring the use of any rotary fluid seal type joint.

The invention provides a wash spray apparatus comprising: a drive mechanism formed by a rotatably driven shaft that defines a longitudinal axis; a bushing carried by said shaft by means of a bore defined in said bushing and mounted coaxially at a fixed axial location on said shaft, said bushing having a external peripheral surface that is annular about a second axis that is angulated with respect to said longitudinal axis; a nozzle head comprising a plurality of nozzles arranged in at least one group thereon positioned and oriented to direct a close spray pattern of narrow jets onto an object to be washed internal passages in said nozzle head communicating with said nozzles, and at least one flexible supply conduit connected to said nozzle head in communication with said internal passages; said shaft being rotatable with respect to said nozzle head, and said apparatus including a restraint connected to said nozzle head to prevent rotation while permitting angulation movement thereof; such that on rotation of said shaft said nozzle head is constrained to nutate with respect to said first axis and thus move the spray pattern of said nozzles in a conical path that has a cone angle that is equal to twice the angulation between said longitudinal axis and said second axis.

The spray pattern emerging from the nozzles accordingly describes a generally circular path on the surface that is to be washed, e.g. the lower sides, rocker panels, and wheels of a vehicle. The diameter of this circular spray pattern will of course vary as a function of the cone angle and of the distance between the wash spray apparatus and the vehicle.

The restraint which prevents rotation of the nozzle head with the driven shaft comprises the one or preferably two flexible supply conduits that are coupled to deliver wash water to the nozzle head.

The wash apparatus is preferably provided in a post that is mounted in the floor adjacent the transport path of vehicles which are moved through an automatic car wash. Where the post is mounted in a fixed position, the diameter of the circular path of the spray pattern on the vehicle will depend upon the width of the vehicle, although if desired, the post could be mounted to be adjustable towards and away from the vehicle. Similarly although it is contemplated that the orientation of the post with respect to the travel path of the vehicle will be transverse to that travel path, provision can be made for the post to swing or oscillate through a limited angular distance in the travel direction of the vehicles to allow an increase in the duration of the spray pattern being applied e.g. to the vehicle wheels.

The driven shaft is preferably driven by an hydraulic motor, and the hydraulic fluid supply and return lines as well as the water supply conduits can readily be enclosed within the post structure.

BRIEF DESCRIPTION OF THE DRAWINGS

The invention will further be described by way of example only, with reference to the accompanying drawings wherein.

BRIEF DESCRIPTION OF THE PREFERRED EMBODIMENTS

Figure 1:
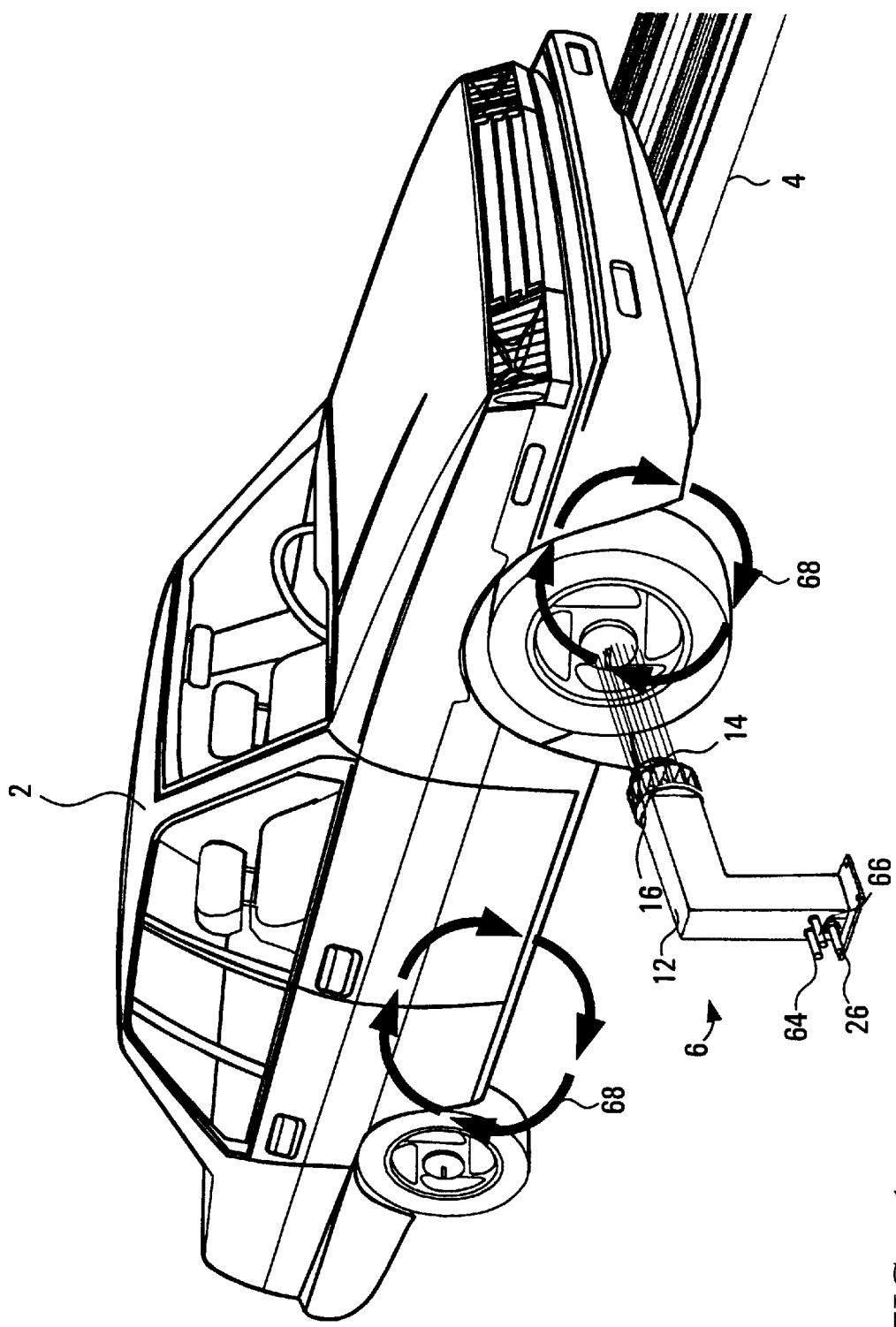
FIG. 1 is a somewhat schematic perspective view illustrating the wash spray apparatus in use in an automatic car wash system.

FIG. 1 represents a perspective view of an automobile 2 being drawn through an automatic car wash along a track 4, details of the conventional spraying, washing, waxing and other components of the automatic car wash being omitted since they are well known and form no part of the present invention.

Figure 2:
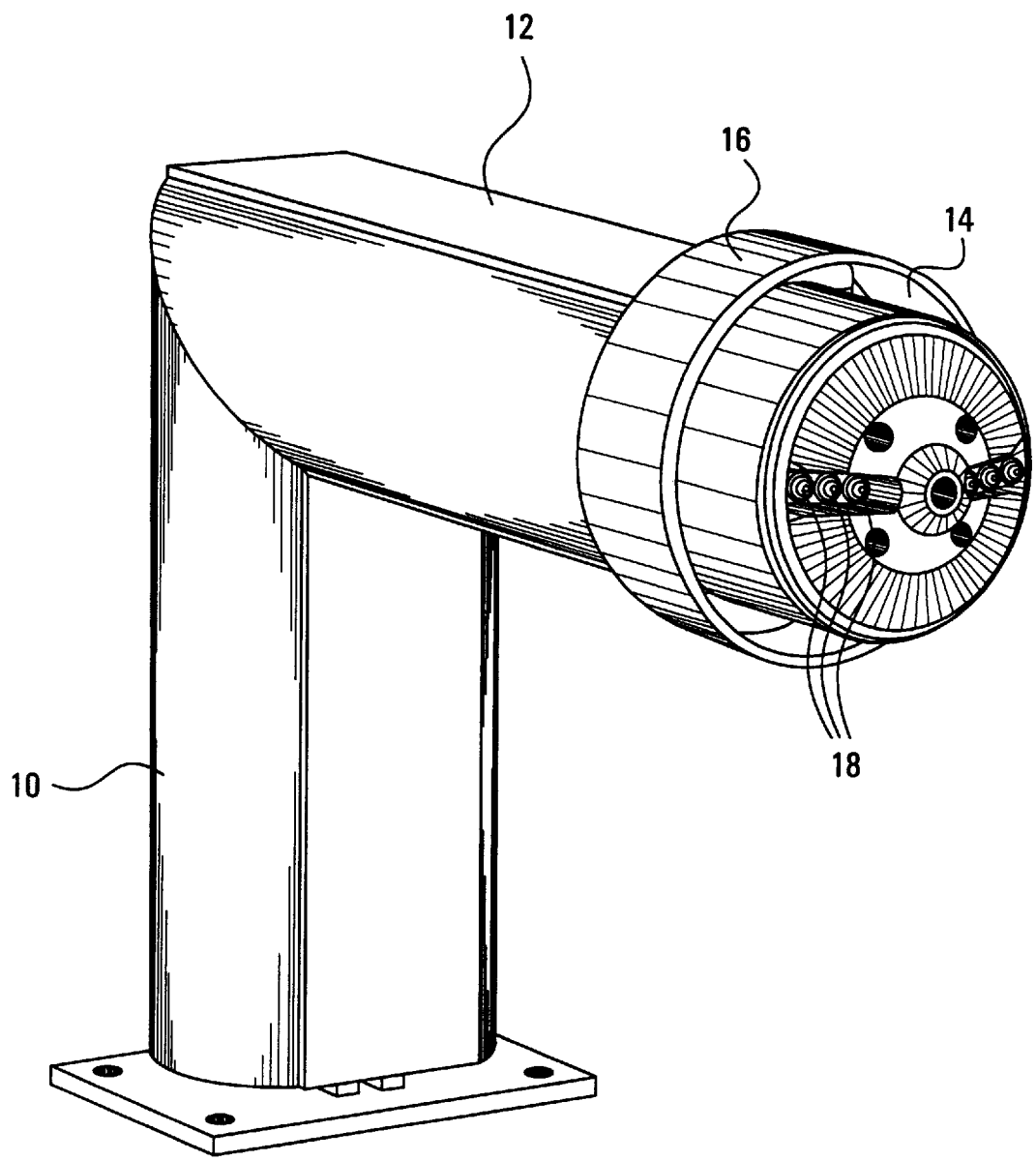
FIG. 2 is a perspective view to a larger scale of the installed wash spray apparatus.

The wash spray apparatus 6 of the invention comprises a post structure which is mounted in the floor adjacent the track 4 and comprises an upright portion 10 at the top of which is a horizontal portion 12 extending towards the track 4 the interior of the portions 10 and 12 being hidden by a casing as seen in FIG. 2.

FIG. 2 shows an external view of the apparatus in which can be seen a nozzle head 14 that is surrounded with clearance within an annular shroud ring 16 carried by the casing of the horizontal post portion 12.

FIG. 2 shows the nozzle head 14 as comprising a series of six nozzles 18 diametrically spaced in groups of three on the front face of the nozzle head 14.

Figure 5:
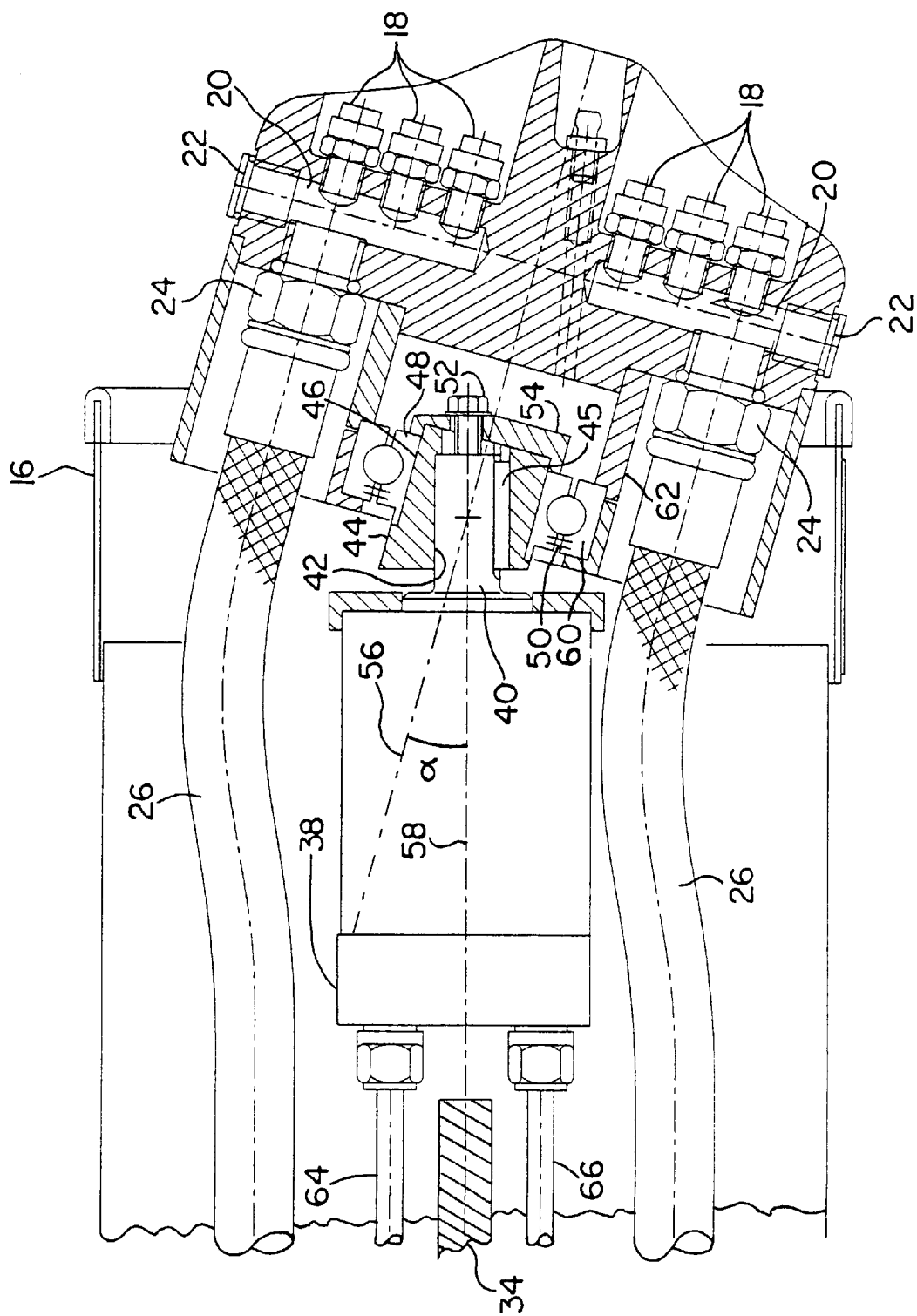
FIG. 5 is an enlarged longitudinal sectional view of the nozzle head and associated components.

The structure of the nozzle head 14 is best illustrated in FIG. 5 as comprising a solid body having within it a network of passages 20 with which the groups of nozzles 18 communicate, the passages being closed to the outside by plugs 22. On the rear side of the nozzle head 14 are hose couplings 24 which serve to attach stiff but flexible high pressure water supply hoses 26 to the nozzle head, with the bores of the hoses 26 in communication with the passages 20 to supply water under pressure thereto.

Figure 3:
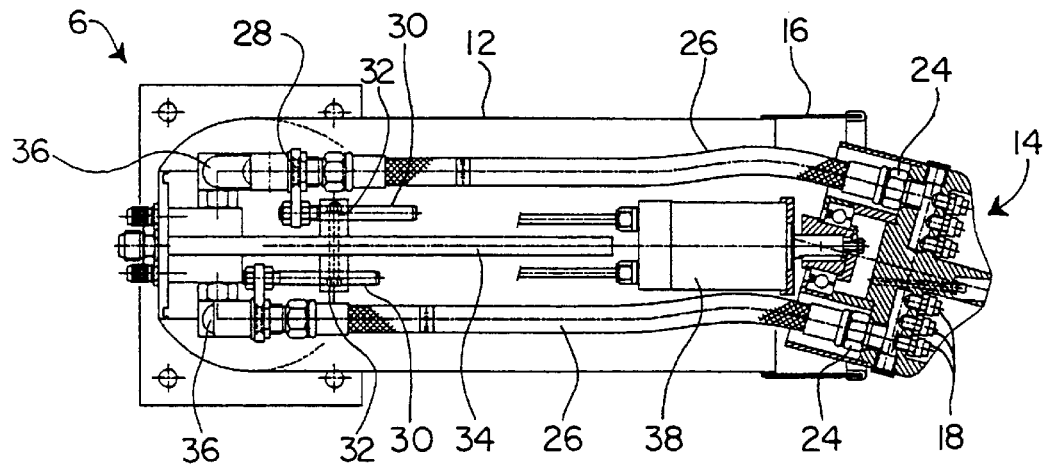
FIG. 3 is a horizontal sectional view of the wash spray apparatus taken through the nozzle head.
Figure 4:
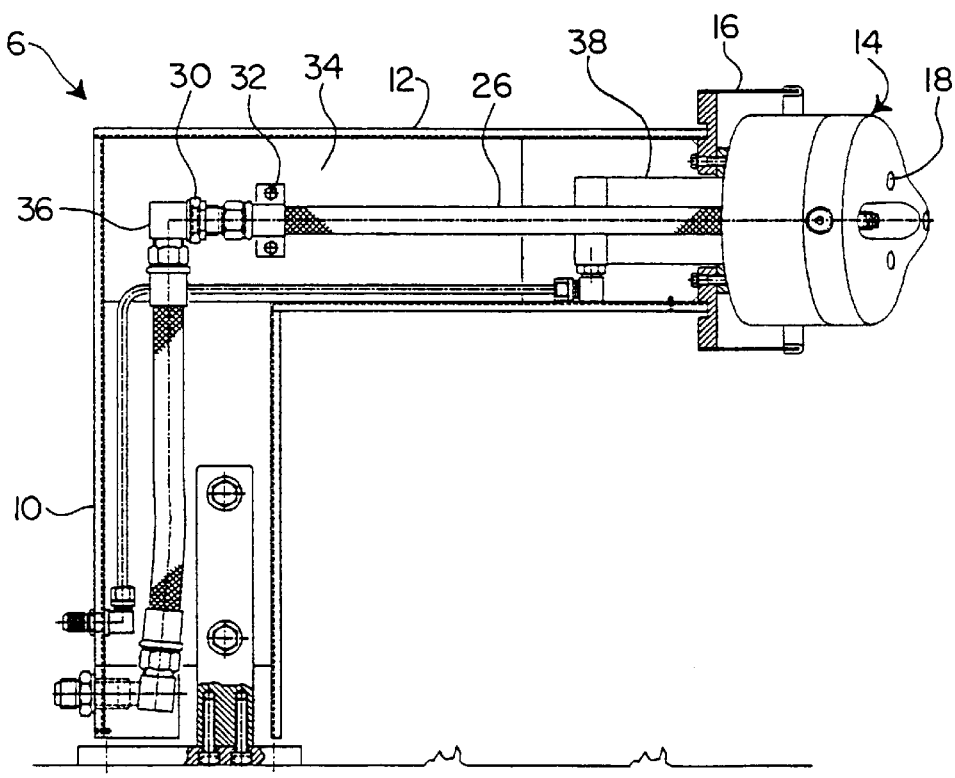
FIG. 4 is a front elevation corresponding to FIG. 3.

Spaced away from the nozzle head 14, each hose 26 carries a laterally extending holder 28 which in turn supports a horizontally extending guide pin 30 which is guided for longitudinal movement by a guide bearing block 32 mounted on a vertical central web plate 34 in the horizontal part 12 of the post structure. To the rear of the holder 28, each hose includes an elbow connection 36, the hose extending downwardly from the latter to an exit point near the base of the post as seen in FIGS. 2 and 4. The structure of the hose 26 can be of any suitable material for the purpose at hand, but must have sufficient strength to withstand the pressure of the wash water, typically from 600 to 1000 psi, and should be sufficiently flexible and resilient as to withstand virtually unlimited cycles of bending to and from the configuration shown in FIG. 3. Conveniently, the hoses 26 are fabricated as wire braid reinforced hydraulic hose, since this is convenient and inexpensive and provides the required physical characteristics. Specifically, such hose can readily withstand the water pressures involved while maintaining its flexibility. Nevertheless such hose has sufficient torsional rigidity and limited elasticity as to provide adequate support to the nozzle head to prevent the latter from rotating. It will be understood that the number of the hoses 26 can be varied as required, but conveniently two hoses 26 are sufficient to provide an adequate flow to a total of six nozzle jets 18.

The horizontal part 12 of the post also provides support for an hydraulic motor 38 which is fixedly mounted to the plate 34 and which has a horizontal drive shaft 40 projecting from one end thereof as seen in FIG. 5. The drive shaft 40 is received within a complementary bore 42 within an angle bushing 44, the drive shaft being keyed as at 45, FIG. 5 or otherwise configured with respect to the bore to form a rotary driving connection therewith.

The angle bushing 44 has an annular peripheral surface 46 which forms a seat for the inner race 48 of a ball bearing assembly 50, the angle bushing 44 being secured in engagement with the drive shaft 40 by a capscrew 52 which passes through a bore in a pressure plate 54 and is in threaded engagement with an axial bore (not shown) in the drive shaft 40. It will be appreciated from FIG. 5 that tightening of the capscrew 52 will be effective to urge the pressure plate 54 to clamp the inner race 40 in its seat on the bushing 44, and also to draw the angle bushing 44 axially into engagement with the drive shaft 40.

The annular surface 46 has an axis 56 that intersects the axis 58 of the shaft 40 at an angle $\alpha$, which in the present case is approximately 15°.

The ball bearing assembly 50 has an outer race 60 received in a seat formed in a tubular pressure ring 62 that is secured to the rear of the nozzle head 14.

The hydraulic motor 38 is driven by pressurized hydraulic fluid circulated through hydraulic lines 64, 66 which pass through the horizontal part 12 and the vertical part 10 of the post exiting at the lower end of the latter as seen in FIG. 1.

From the foregoing description it will be understood that supply of high pressure water through the hoses 26 to the nozzle head 14 will produce a series of closely spaced and parallel narrow jets of water emanating from the nozzles 18. The jets from the nozzles 18 will travel in a tight pattern generally parallel to the axis 56, it being noted that this axis also constitutes the axis of the nozzle head 14 and that the nozzles 18 are parallel to it.

It will readily be envisioned that when the drive shaft 40 is rotated by the hydraulic motor 38, the hoses 26 through their stiffness provide restraint against rotation of the nozzle head 14. However since the bushing 44 is keyed to rotate with the shaft 40, the nozzle head 14 will be constrained to perform a nutation movement, so that for every 360° rotation of the motor shaft 40, the axis 56 and consequently the spray pattern produced by the nozzles 18 will trace out a conical path. As will be evident from FIG. 5, the hoses 26 will flex first one way and then the other in accordance with the angular orientation imparted to the nozzle head 14 by the shaft 40/angle bushing 44 interaction. The arrangement of the hose holder 28 with guide pin 33 interacting with the guide bearing block 32 on the web plate 34 accommodates slight movements of the hose 26 longitudinally in the horizontal direction, while maintaining the hoses within a degree of confinement so that they do not move around unrestrictedly within the post 10, 12. It would of course be possible to make each of the hoses from one continuous piece bent at right angles and thus dispense with the elbow connection and its associated hardware. However it would still be desirable to apply some restraint to the hoses in the angled regions thereof.

Any means selected to restrain the nozzle head 14 against rotation must still accommodate nutating movement of the nozzle head, and this can be done in various ways. For example rather than relying on the hoses 26, restraint of the nozzle head could be effected by providing interengaging bevel gears (not shown), one being fixed in relation to the motor 38, and the other being fixed in relation to the nozzle head. The interengaging gears would be equal in size and the nozzles 18 would be angled slightly with respect to the axis 56 so as to generate a reaction torque which would cause the engagement point between the bevel gears to rotate and thus produce the desired nutating movement of the spray. The bevel gears would conveniently have a gear ratio of 1:1.

In operation of the wash spray apparatus in a car wash situation as illustrated in FIG. 1, the nozzle spray will continuously sweep through a circular path of impingement against the lower sides and wheels of the automobile 2 as indicated by the large arrows 68 in FIG. 1. The rate of rotation of the spray will be dependent upon the speed at which the hydraulic motor 38 is driven, and can be very high a preferred rate being about 120 r.p.m. The combined effects of the high speed rotation of the nozzle spray and the high pressure of the water supply to the nozzles produces an excellent cleaning action to the surfaces of the automobile being cleaned, these surfaces being treated to repeated sweeps of the spray nozzle at closely spaced intervals as the automobile 2 progresses along the track 4.

Since it is often the case that the most difficult part of an automobile to clean effectively is its wheels, it is envisaged that the wash spray apparatus could be mounted so that in addition to the nutation movement, the spray head is also capable of a limited degree of angular oscillation horizontally in the travel direction of the automobile. This can be provided for by arranging the vertical part 10 of the post to be mounted to pivot slightly about a vertical axis, and providing means to track the location of the vehicle wheels and control pivotal action of the post 10 to track the wheels through a limited range of movement and thus intensify the cleaning action that is applied to the wheels.

As shown in the drawings, the nozzles on the head 14 are six in number, arranged in two groups of three. Clearly different arrangements of nozzles could be provided. However the number of nozzles supplied by each of the flexible conduits 26 should be limited to no more than three, since to supply more than three nozzles would require a larger conduit or hose 26. However smaller hoses are more flexible and therefore have a longer service life, and accordingly for this purpose it is preferred that the number of nozzles supplied by each hose 26 is not more than three.

The nozzles can of course be grouped in any suitable arrangement.

It is envisaged that the principal application for the disclosed wash spray apparatus will be as shown in the drawings, i.e. positioned to wash the rocker panel and wheel areas of vehicles moving through a car wash. However there is nothing which would restrict application of the wash spray apparatus to this arrangement. In particular, a series of the spray heads as disclosed could be mounted on an arch spanning across the sides and the top of a vehicle, so that essentially all the vehicle surfaces would be washed by the rapidly rotating sprays produced from a series of nozzle heads.

What is claimed is:

1. A wash spray apparatus comprising:

a drive mechanism formed by a rotatably driven shaft that defines a longitudinal axis;

a bushing carried by said shaft by means of a bore defined in said bushing and mounted coaxially at a fixed axial location on said shaft, said bushing having an external peripheral surface that is annular about a second axis that is angulated with respect to said longitudinal axis;

a nozzle head comprising a plurality of nozzles arranged in at least one group thereon positioned and oriented to direct a close spray pattern of narrow jets onto an object to be washed, internal passages in said nozzle head communicating with said nozzles, and at least one flexible supply conduit connected to said nozzle head in communication with said internal passages;

said shaft being rotatable with respect to said nozzle head, and said apparatus including a restraint connected to said nozzle head to prevent rotation while permitting angulation movement thereof;

such that on rotation of said shaft said nozzle head is constrained to nutate with respect to said longitudinal axis and thus move the spray pattern of said nozzles in a conical path that has a cone angle that is equal to twice the angulation between said longitudinal axis and said second axis.

2. A wash spray apparatus as claimed in claim 1 wherein said restraint comprises said at least one flexible supply conduit.

3. A wash spray apparatus as claimed in claim 1 wherein there are two groups of nozzles, each group being connected to a respective flexible supply conduit.

4. A wash spray apparatus as claimed in claim 3 wherein each nozzle group contains three nozzles.

5. A wash spray apparatus as claimed in claim 1 including a post for mounting in a floor structure, said post having an upper end that includes a laterally projecting extension, said drive mechanism being carried within said extension and said nozzle head being carried at a distal end of said extension.

6. A wash spray apparatus as claimed in claim 5 wherein said at least one flexible supply conduit is positioned within said post.

7. A wash spray apparatus as claimed in claim 5 including an hydraulic motor connected to drive said driven shaft.

8. A wash spray apparatus as claimed in claim 5 including an hydraulic motor connected to drive said driven shaft, said hydraulic motor being carried on said post extension, and wherein said at least one supply conduit together with hydraulic fluid lines for said hydraulic motor are located within said post.

* * * * *